June 10, 1924.

W. E. BEE ET AL 1,496,866

REDUCTION GEARING

Filed Aug. 21, 1922

Inventors
WILLIAM. E. BEE
WILLIAM. E. SIMPSON

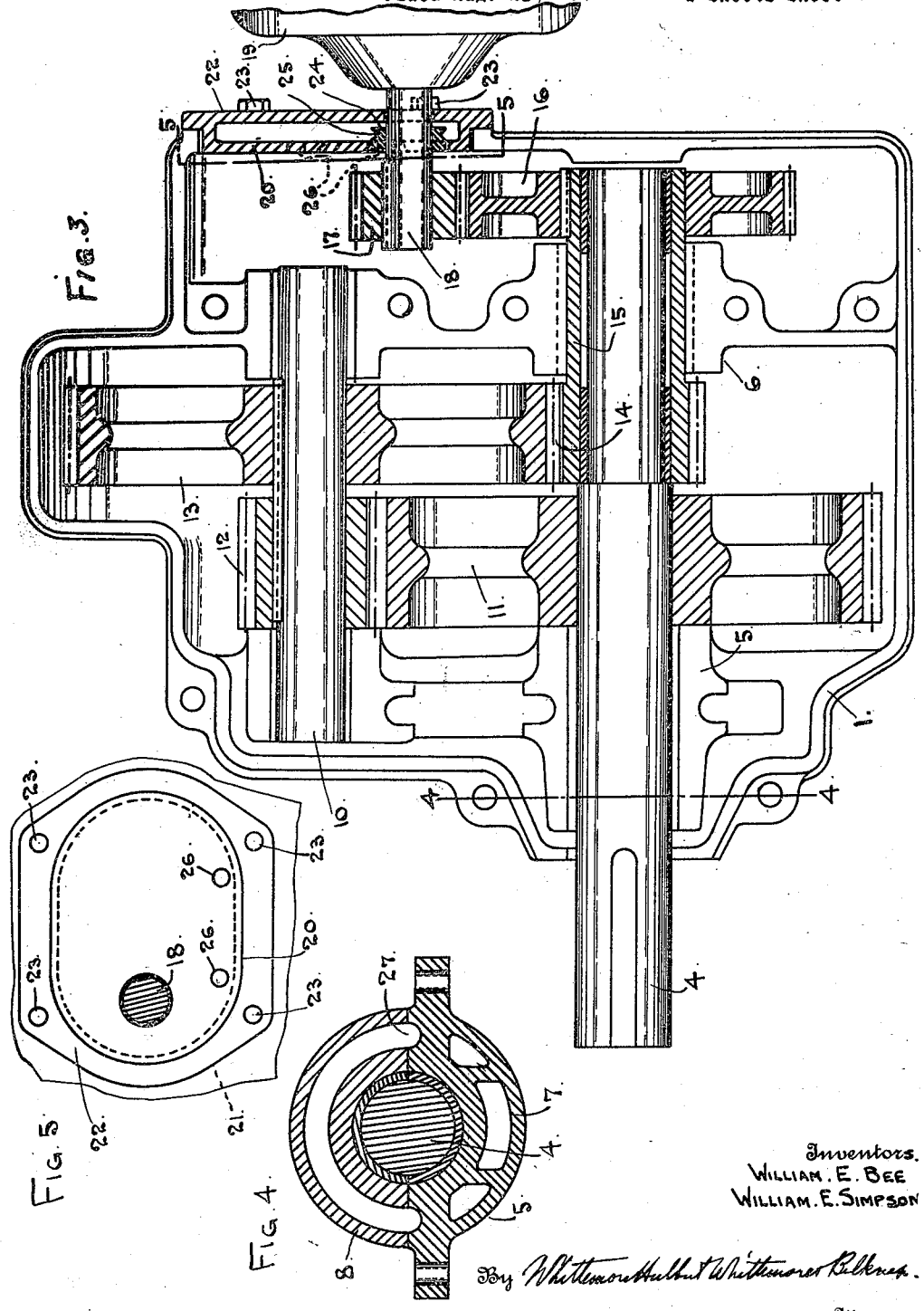

Patented June 10, 1924.

1,496,866

UNITED STATES PATENT OFFICE.

WILLIAM E. BEE AND WILLIAM E. SIMPSON, OF DETROIT, MICHIGAN, ASSIGNORS TO PALMER-BEE COMPANY, OF DETROIT, MICHIGAN, A CORPORATION OF MICHIGAN.

REDUCTION GEARING.

Application filed August 21, 1922. Serial No. 583,331.

*To all whom it may concern:*

Be it known that we, WILLIAM E. BEE and WILLIAM E. SIMPSON, a citizen of the United States of America, and a subject of the King of Great Britain and Ireland, respectively, residing at Detroit, in the county of Wayne and State of Michigan, have invented certain new and useful Improvements in Reduction Gearing, of which the following is a specification, reference being had therein to the accompanying drawings.

The invention relates to reduction gearing and has for its object the provision of reduction gearing in which the power shaft is journalled in bearings secured to the lower section of the housing, the upper section of the housing being removably secured to the lower section independently of the bearings; and in which the power shaft has its axis in substantially the plane of the meeting edges of the housing sections and the bearings comprise lower half bearings and caps removably secured thereto, whereby upon removal of the upper housing section and the bearing caps, the gearing as well as the shaft can be readily removed. Another object is to provide bearings for the power shaft having their lower halves connected to the lower housing section by lateral webs which have grooves or troughs in their upper surfaces for collecting lubricant, thereby avoiding liability of lubricant leaking from the housing through the joint between its lower and upper sections. Further objects are to provide a novel form of oiling device for a bearing; to provide a double walled closure which is removably secured to the housing and may be bored at various positions for the passage of the drive shaft the locations of the bores depending upon the relative sizes of the pinion upon the drive shaft and the gear wheel with which it meshes; and to provide a novel form of oil slinger upon the drive shaft having an annular shoulder intermediate the walls of the closure. Other objects of the invention reside in the novel features of construction and combinations and arrangements of parts as more fully hereinafter set forth.

In the drawings:

Figure 1 is a side elevation partly broken away of a reduction gearing embodying our invention;

Figures 2 and 3 are cross sections respectively on the lines 2—2 and 3—3 of Figure 1;

Figure 4 is a cross section on the line 4—4 of Figure 3;

Figure 5 is an inside elevation of the gear housing.

Figure 1:
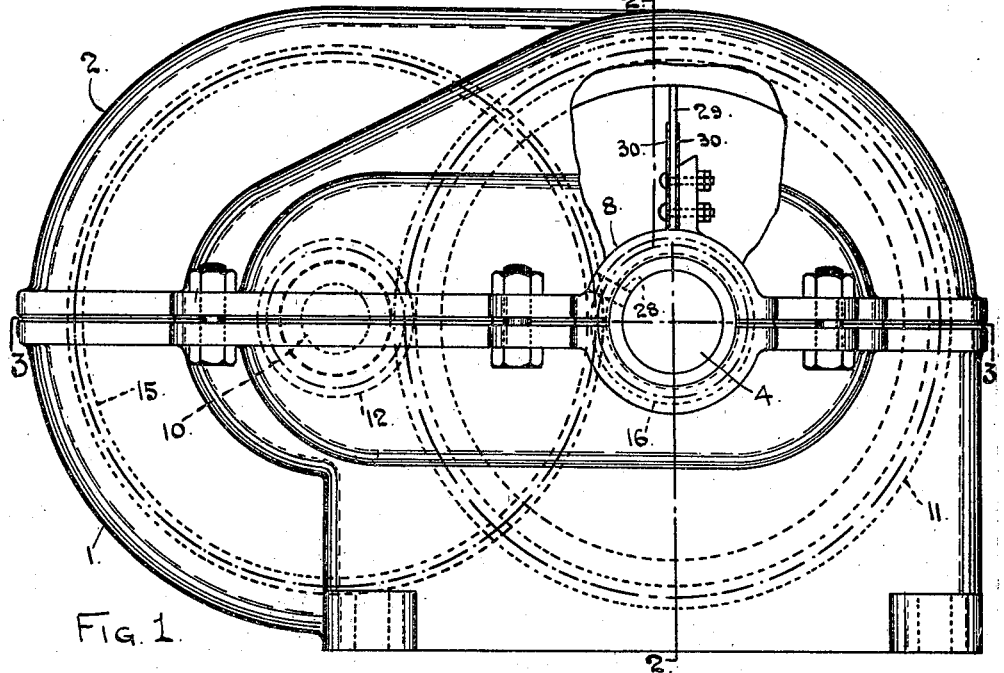
Figure 2:
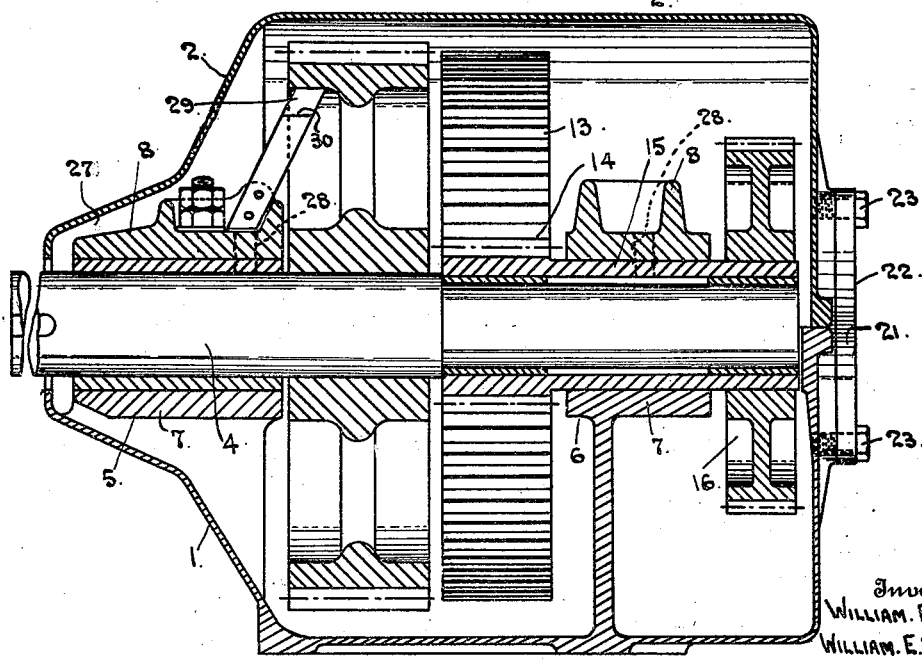

1 is the lower section of the housing and 2 the upper section removably secured thereto by the bolts 3. 4 is the power shaft having its axis substantially in the plane of the meeting edges of the housing sections. This power shaft is journalled in bearings 5 and 6 near opposite sides of the housing, each bearing comprising the lower half bearing 7 preferably formed integral with the lower housing section 1 and the bearing cap 8 removably secured to the lower half bearing by the bolts 9. 10 is a counter shaft extending parallel to the power shaft 4 and journalled in the bearings 5 and 6. The reduction gearing comprises the gear wheel 11 secured upon the power shaft 4 adjacent to the bearings 5, the pinion 12 secured upon the counter shaft 10 and meshing with the gear wheel 11. The gear wheel 13 secured upon the counter shaft 10 between the pinion 12 and the bearing 6 and meshing with the pinion 14 integral with the sleeve 15 between the gear wheel 11 and the bearing 6. This sleeve is rotatable about the power shaft. A gear wheel 16 is also secured upon the outer end of the sleeve 15 between the bearing 6 and the adjacent side wall of the housing this gear wheel meshing with the pinion 17 which is secured to the drive shaft 18 of the electric motor 19 mounted at the side of the housing.

The drive shaft 18 freely extends through the spaced walls 20 and 21 of the double wall closure 22 removably secured to the sides of the lower and upper housing sections by the cap bolts 23. The locations of the aligned bores in the spaced walls of the closure through which the drive shaft 18 extends, are dependent upon the relative sizes of the gear wheel 16 and pinion 17, the arrangement being such that each time a different size gear wheel and pinion are used, a new double wall closure is substituted for the previous closure and having the aligned bores in its walls properly located. As a consequence, the gear reduction can be readily changed without the necessity of requiring new upper and lower housing sections.

For the purpose of preventing the escape of oil along the drive shaft 18 from the housing, there is the oil slinger 24 secured upon the drive shaft to rotate therewith and having the annular shoulder 25 positioned between the inner and outer walls 20 and 21 of the closure 22. Suitable outlets such as the passageways 26 are also provided leading from the lower portion of the cavity between the walls into the space inclosed by the housing for draining the oil which is thrown off by the oil slinger.

The lower half bearings 7 of the bearings 5 and 6 have their upper faces in substantially the plane of the meeting edges of the housing sections and are cast integral with the lower housing section and connected thereto by lateral webs as well as vertical webs. To avoid liability of the oil contained in the housing leaking between the joint of the upper and lower housing sections, the upper faces of the lateral webs are grooved at 27 to form troughs for receiving the oil, these grooves communicating with the spaces formed between the vertical webs below the lower half bearings and carrying the same so that any oil entering the grooves may return to the lower portion of the lower housing section.

To lubricate the bearing 5, the upper surface of the cap bearing 8 has a depression therein which is in communication with the bearing surfaces for both the power shaft 4 and counter shaft 10 through the bored passageways 28. 29 is an upwardly inclined flexible fibrous member, preferably formed of leather, the upper end of which contacts with the gear wheel 11. 30 are resilient reinforcing strips on opposite sides of the fibrous member and having their upper ends spaced from the rim of the gear wheel, the lower ends of these strips as well as the lower end of the fibrous member being secured to the bearing cap. With this arrangement, oil carried upwardly by the rim of the gear wheel is scraped off by the fibrous member and conveyed to the depression in the bearing cap and then to the bearing surfaces engaging both the power and counter shafts. The bearing cap of the bearing 6 also has a similar depression in its upper face communicating with the bearing surfaces in engagement with the power and counter shafts. This depression is kept filled by oil splashed from the high speed gears 13 and 16.

What we claim as our invention is:

1. In gearing, the combination with upper and lower sections of a gear housing, of a shaft extending through a wall of the housing with its axis in substantially the plane of the meeting edges of said sections, gearing housed within said sections and operatively connected to said shaft, and bearings for said shaft within the housing, one of said bearings being connected to one of said sections by a lateral web providing a trough between the meeting edge of said section and said bearing.

2. In gearing, the combination with upper and lower sections of a gear housing, of a shaft extending through a wall of the housing with its axis substantially in the plane of the meeting edges of said sections, gearing housed within said sections and operatively connected to said shaft, and bearings for said shaft within the housing comprising supporting half bearings and bearing caps having their meeting edges in substantially the plane of the meeting edges of said sections, said upper section and bearing caps being removably secured respectively to said lower section and supporting half bearings, one of said half bearings being connected to said lower section by a lateral web providing a trough between the upper edge of said lower section and half bearing.

3. In gearing, the combination with a lower housing section, of a shaft having its axis in substantially the plane of the upper edge of said section, gearing extending within said section and operatively connected to said shaft, and a bearing for said shaft extending adjacent and connected to said section by a lateral web integral with said section and bearing, said web providing a trough between the upper edge of said section and said bearing.

4. In gearing, the combination with a housing section, of a power shaft extending therewithin, a counter shaft therewithin, gearing upon said power shaft and counter shaft, and an integral bearing for said power shaft and counter shaft connected to said housing section by a lateral web providing a trough between said housing section and bearing.

5. In gearing, the combination with a lower section of a gear housing, of a shaft extending through a wall of the housing with its axis in substantially the plane of the upper edge of said housing section and operatively connected to said shaft, bearings for said shaft within the housing section comprising supporting half bearings and bearing caps having their meeting edges in substantially the plane of the upper edge of said housing section, said bearing caps being detachably secured to said half bearings, one of said half bearings being connected to said housing section by a lateral web providing a trough between the upper edge of said housing section and half bearings, and an upper housing section detachably secured to said lower housing section.

6. In gearing, the combination with a gear housing, of a power shaft extending through a wall of said housing and journaled thereon, gearing within said housing for driving said power shaft, including a gear wheel and a pinion meshing with said gear wheel, a drive shaft extending within said housing and carrying said pinion, an oil slinger upon said drive shaft having an annular shoulder, and a double walled closure member forming part of said housing and through which said drive shaft extends and between the walls of which said annular shoulder is located, said closure member having provision for permitting the selective location of said drive shaft dependent upon the relative sizes of said gear wheel and pinion.

In testimony whereof we affix our signatures.

WILLIAM E. BEE.
WILLIAM E. SIMPSON.